United States Patent [19]
Robinson

[11] 3,993,320
[45] Nov. 23, 1976

[54] RESILIENT HITCH FOR CYCLE TRAILER
[76] Inventor: Russell S. Robinson, 3330 N. Webster Place, Tucson, Ariz. 85715
[22] Filed: June 13, 1974
[21] Appl. No.: 478,935

[52] U.S. Cl. ............................. 280/204; 280/485; 280/492
[51] Int. Cl.² .................. B62K 27/02; B62K 27/12
[58] Field of Search .......... 280/204, 292, 483, 485, 280/498, 499, 488, 489, 492

[56] References Cited
UNITED STATES PATENTS

| | | |
|---|---|---|
| 3,567,249 | 3/1971 | Robinson ............................. 280/204 |
| R26,806 | 3/1970 | Robinson ............................. 280/204 |

FOREIGN PATENTS OR APPLICATIONS

| | | |
|---|---|---|
| 888,124 | 12/1943 | France ............................... 280/204 |
| 888,266 | 12/1943 | France ............................... 280/204 |
| 870,336 | 3/1942 | France ............................... 280/204 |
| 888,333 | 12/1943 | France ............................... 280/204 |

*Primary Examiner*—M. H. Wood, Jr.
*Assistant Examiner*—John P. Silverstrim

[57] ABSTRACT

A two-wheeled trailer for towing behind a cycle having a tongue which extends forwardly and on one side of the rear end of the rear wheel of the cycle. The forward end of the tongue is provided with a conveniently disconnectable hitch which is mounted on one side of the cycle and usually adjacent the rear wheel axle of same. The hitch comprises a resilient member having a pivotal connection disposed between the tongue and the cycle which provides the trailer with freedom of movement about one axis relative to the cycle, the resilience of the member providing the trailer with freedom of movement about the other two axes relative to the cycle.

6 Claims, 5 Drawing Figures

U.S. Patent  Nov. 23, 1976  3,993,320
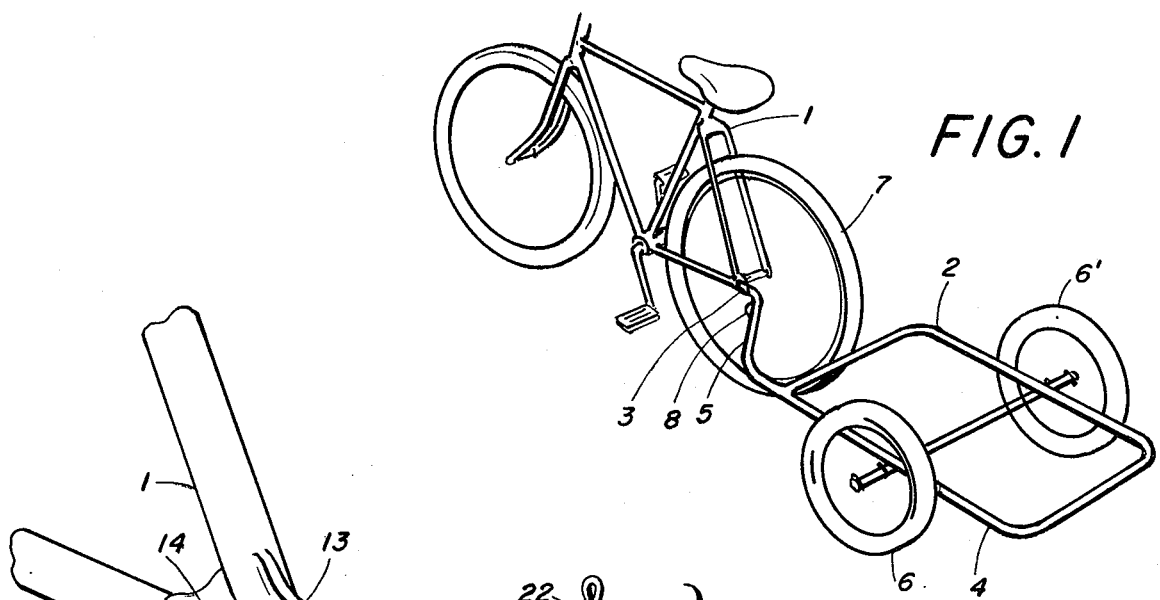
FIG. 1
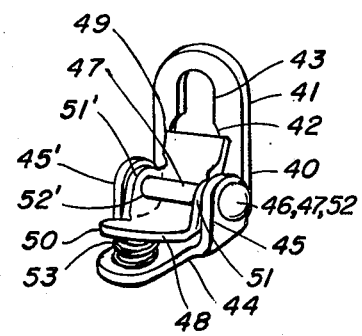
FIG. 2
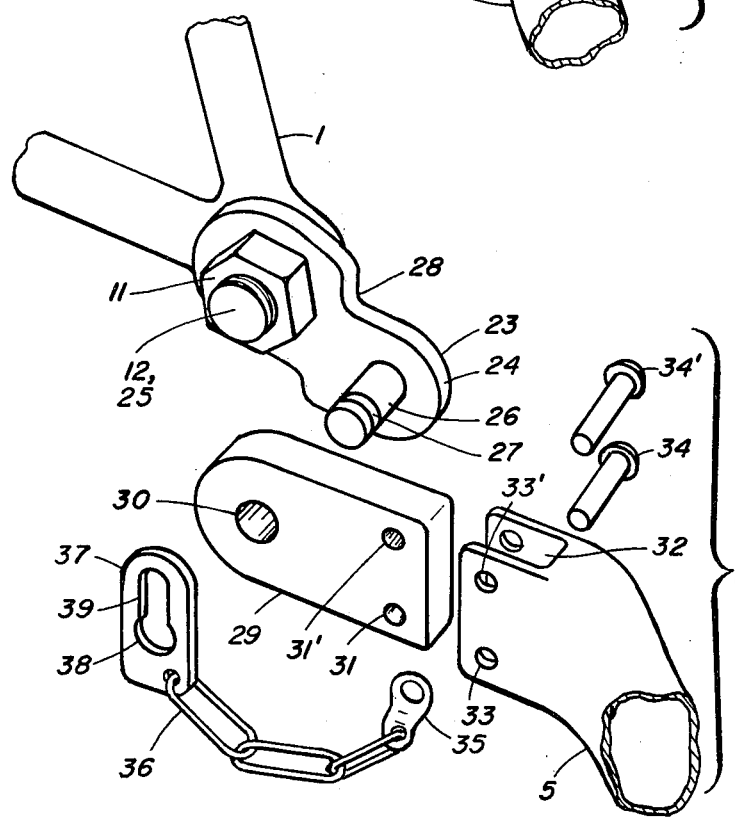
FIG. 3
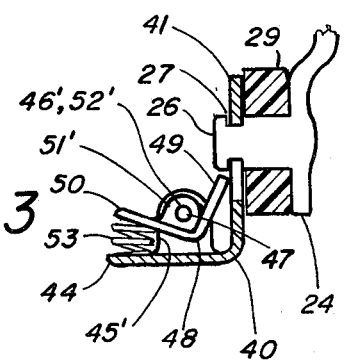
FIG. 4
FIG. 5

RESILIENT HITCH FOR CYCLE TRAILER

This invention relates to improvements in trailers having usually two laterally disposed wheels for connecting to and towing behind cycles, and more particularly to the hitch for connecting such trailers to cycles. Cycles are defined herein as pedal or motor powered cycles.

The primary objective of the invention is to provide a hitch for connecting said trailer and said cycle which is disposed usually at a low point in the structure of said cycle in order to minimize the tendency of the trailer to pull the cycle over during turns, and in such a manner that the trailer may pivot with respect to the cycle about the turn, roll and pitch axes of same.

The invention embodied in my U.S. Pat. No. Re 26,806 relates to the same objective. However, the hitch in said invention comprises a universal mechanism having a plurality of mutually pivoted and articulating elements which tend to loosen and become noisy with increasing wear.

The object in this present invention is to realize freedom or partial and adequate freedom of said trailer about the turn, roll and pitch axes of said cycle by provision of a hitch comprising usually a single resilient or flexible member which is pivotally connected between said cycle and said trailer about one of said axes in lieu of the relatively complicated universal mechanism as defined in the connecting hitch means of U.S. Pat. No. Re 26,806.

A further object of the invention is the provision of a device for quickly releasing or reconnecting said trailer to said cycle. A related object thereto being the provision of a manually operable spring urged locking means for preventing the accidental disconnection of said device. Other objects and features of the invention will become apparent from a reading of the specification taken with the drawings, in which:

FIG. 1 is a view in perspective of the rear end of a cycle shown with a trailer connected thereto by means according to the invention. For sake of simplicity the chassis only of the trailer is shown.

FIG. 2 shows a partly exploded view in perspective of a hitch having a resilient hitch member connected to the cycle and pivotally connected to the tongue of the trailer.

FIG. 3 shows a fully exploded view in perspective of a hitch having a resilient hitch member connected to the tongue of said trailer and pivotally connected to the cycle, said hitch having a conveniently disconnectable retaining device with a simplified retainer key.

FIG. 4 shows in perspective a form of retaining device comprising a spring-urged locking means.

FIG. 5 shows a vertical section of the spring-urged locking means.

Referring now to the drawings, there is illustrated in the perspective view of FIG. 1 the rear portion only of a cycle 1 of very widely known construction which is connected to a two-wheeled trailer 2 by a hitch means 3. Trailer 2 comprises a frame 4 to which is rigidly connected a tongue 5, said tongue extending forwardly of said frame and on one side only of same. Tongue 5 is further disposed at an angle with respect to frame 4 in such that when cycle 1 is turned in the direction opposite the side to which tongue 5 is disposed and through as sharp a turn as can be reasonably performed by a skilled rider, said tongue will not contact the rear end of the rear wheel, its fender or any other usual structure of cycle 1. Tongue 5 is formed in such manner that when cycle 1 is ridden on a straight and forward course, said trailer tracks substantially centrally behind said cycle, the plane of the wheels 6, 6' of said trailer being approximately parellel with that of the rear wheel 7 of cycle 1. A connector loop 8 is usually rigidly connected by welding or other means to tongue 5 for receiving an anti-theft chain and lock (not shown) or supplementary safety chain.

Referring to FIG. 2, hitch 3 according to this example comprises a member 9 which is formed of a short length of fabric-reinforced synthetic rubber power belting of well known manufacture. Said member is provided with end holes 10, 10' disposed at the rearward and forward ends respectively thereof, said member being connected to cycle 1 by removing the axle nut 11 from the rear axle 12 of same and assembling on said axle in the following order: a washer-spacer 13 member 9 via its forward end hole 10 (not shown), a washer 14, and axle nut 4. Nut 11 is then tightened until member 9 is firmly connected to cycle 1 at a convenient angle about axle 12 in order to clear original structural members (not shown) of cycle 1. Said member thereby becomes a quasi-permanent component of cycle 1. A fork 15 is formed at the forward end of tongue 5 at such an angle that the opening 16 of said fork is substantially parallel with the planes of trailer wheels 6, 6'. A perpendicular hole 17 is formed through fork 15, said hole having substantially the same diameter as rear hole 10 of member 9. To connect trailer 2 to cycle 1 according to this example, said trailer is maneuvered so that the rear end of member 9 is received in opening 16. When holes 10 and 17 become approximately coaxial a standard clevis pin 18, having a shank 19 of slightly smaller diameter to that of holes 10 and 17, a head 20 and a lock hole 21, is passed through holes 10 and 17 and a retaining split pin 22 is disposed in lock hole 21. According to the FIG. 2 example, angular freedom in pitch of tongue 5 and trailer 2 with respect to cycle 1 is provided by the freedom of fork 15 to pivot about clevis pin 18 with respect to resilient member 9, angular freedom in yaw is provided by the flexibility in bending of member 9; and angular freedom in roll is provided by the flexibility in torsion of said member. Member 9 is usually formed to be sufficiently long with respect to its section to provide for roughly 90° of twist, or freedom in roll, so that cycle 1 can roll over to the ground on its left or right sides without excessively straining said member or any other component of said cycle or said trailer. It will be clearly understood that within the scope of the invention the axes of either end holes 10, 10' of member 9 need not be formed to be normally parallel with each other, and need not be horizontal with respect to cycle 1.

Referring to FIG. 3, according to this example an adaptor 23 having a plate metal body 24 is provided near one end of said body with a hole 25 (not shown) of larger diameter than that of rear axle 12 of cycle 1. A trunnion 26 is formed near the opposite end of said body. Near the outer end of said trunnion with respect to said body a retaining groove 27 is formed. An offset joggle 28 is formed in body 24 between hole 25 and trunnion 26 for the purpose of moving the trunnion end of adaptor 23 outwardly away from possible interference with structural members cycle 1 such as fender brackets, axle adjusters and the like (not shown), and to provide additional space for the flexing of resilient member 29. Adaptor 23 is connected to cycle 1 by removal of axle nut 11, disposing 24 on axle 12 via mating hole 25, then replacing nut 11. Said nut is then tightened so that adapter 23 and its trunnion 26 are rigidly connected to cycle 1 thereby becoming a quasi-permanent component thereof. Resilient member 29, is formed of a length of belting similar to that of resilient member 9 of FIG. 2. Near one end of member 29, a hole 30 is provided which pivotally receives trunnion 26. Near the opposite end of member 29 a pair of rivet holes 31, 31' are provided. A fork 32 of similar form and angle to fork 15 of FIG. 2 is formed in the forward end of tongue 5. Fork 32 is provided with a pair of rivet holes 33, 33' of similar diameter and spacing to holes 31, 31'. Resilient member 29 is disposed in fork 32, said member being rigidly connected to tongue 5 and thereby trailer 2 by means of rivets 34, 34' which are headed over in well known manner. A chain terminal 35 of known form is disposed on and retained by rivet 34', said terminal being connected to a short length of light chain 36. A retaining key 37 is connected to the opposite end of chain 36.

A hole 38 and slot 39 are formed in key 37, the diameter of hole 38 being slightly larger than that of trunnion 26, the width of slot 39 being slightly larger than the diameter at the base of groove 27, and the thickness of key 37 being slightly less than the width of groove 27. To connect trailer 2 to cycle 1 according to the FIG. 3 example, said trailer is maneuvered so that hole 30 of resilient member 29 becomes coaxial with trunnion 26 and member 29 is pushed fully home on said trunnion. Key 37 is slipped over said trunnion and slid downwardly so that slot 39 is accomodated in groove 27 in well known manner, thereby positively retaining member 29 to trunnion 26 of adaptor 23. Note that when trailer 2 is disconnected from cycle 1, key 37 is connected at all times to tongue 5 and trailer 2 by means of chain 36 to prevent loss or misplacement of said key.

Under some conditions of maneuvering and rough riding, retainer key 37 can move upwardly out of engagement with groove 27 and slip off trunnion 26, thereby accidently disconnecting trailer 2 from cycle 1. To prevent such accidental disconnection, the invention provides for use of a lockable, manually releasable retaining means.

Referring to FIGS. 4 and 5, said means may comprise a key body 40 in the upper end 41 of which a hole 42 and slot 43 are formed which are respectively similar to hole 38 and slot 39 of retaining key 37. The lower end 44 of key body 40 is bent outwardly at right angles with respect to upper end 41, and lugs 45, 45' are formed at the opposite edges of lower end 44. Said lugs are provided with coaxial holes 46, 46' which receive a pivot pin 47. A generally similarly contoured but smaller lock rocker 48 having an upper wing 49, a lower wing 50 and side lugs 51, 51' which are provided with holes 52, 52' of similar diameter to pivot holes 46, 46' of key body 40, is disposed between lugs 45, 45' of body 40, in such manner that said rocker can oscillate with respect to key body 40 about the pivot pin 47. A compression spring 53 is disposed between lower end 44 of key body 40 and lower wing 50 of rocker 48 in such manner as to urge the upper wing 49 of said rocker to maintain contact with the upper end 41 of key body 40, as shown in FIG. 5. Upper wing 49 of rocker 48 is vertically disposed with respect to slot 43 in the upper end 41 of body 40 in such manner that when the groove 27 of trunnion 26 is fully seated in slot 43, said upper wing is disposed under said trunnion 26 and in contact with the upper end of body 40 in such manner that body 40 cannot rise with respect to trunnion 26 sufficiently to enable hole 42 to become coaxial with trunnion 26. Such coaxiality cannot occur and said retaining means cannot accordingly be disconnected until lower wing 50 of lock rocker 48 and lower end 44 of key body 40 are manually squeezed together against the thrust of spring 53, thereby moving upper wing 49 of rocker 48 away from interference with trunnion 26. It will be understood that key body 40 may be connected to either the rear axle 12 or another member of cycle 1, or to tongue 5 or another member of trailer 2 by means of a chain or other connecting means such as chain 36 in order to prevent the loss of said manually releasable locking means.

Referring to the above examples, it will be understood although the hitch 3 is shown in all the above examples as being connected to or adjacent to the rear axle of cycle 1, said hitch may be connected to any portion of any fixed member or members of the cycle structure, including any supplementary member which may be added for the purpose, which is disposed on one side or on the opposite side of said cycle. Lastly, it will be understood that although all the examples show the invention applied to a pedal-propelled cycle, the invention may be applied also to cycles having other forms of propulsion, including motor-propelled cycles.

What I claim is:

1. In combination with a cycle and a two-wheeled trailer to be disposed behind said cycle, said trailer having a tongue extending forwardly of the rear end of the rear wheel of said cycle and laterally displaced to one side of said cycle, a hitch for connecting the forward end of said tongue to one side of said cycle, said hitch comprising a resilient member having a pivotal connection to one of said cycle and said tongue which provides freedom of movement of said tongue and said trailer about one axis relative to said trailer, the resilience of said member providing freedom of movement of said tongue and said trailer about the remaining two axes relative to said cycle.

2. The combination as claimed in claim 1 wherein said pivotal connection comprises a pivot pin connected to one of said cycle and said tongue, and wherein said resilient member is provided with a hole which pivotally receives said pin.

3. The combination as defined in claim 2 wherein said pivot pin is provided with a removable retainer device, the removal of said device permitting the removal of said pin and the disconnection of said hitch.

4. The combination as defined in claim 1 wherein said pivotal connection comprises a trunnion connected to one of said cycle and said tongue, said resilient member being pivotally mounted on said trunnion.

5. The combination as defined in claim 4 in which said trunnion is provided with a removable device which positively retains said resilient member in cooperation with said trunnion.

6. The combination as defined in claim 5 in which said device is provided with a spring-urged locking means which prevents accidental disengagement of said device from said trunnion and thereby the accidental disconnection of said trailer from said cycle.

* * * * *